(12) United States Patent
Sharma et al.

(10) Patent No.: US 10,976,815 B2
(45) Date of Patent: *Apr. 13, 2021

(54) CONTEXT AWARE SELECTIVE BACKLIGHTING TECHNIQUES

(71) Applicant: Intel Corporation, Santa Clara, CA (US)

(72) Inventors: Dhaval V. Sharma, Ahmedabad (IN); Nivruti Rai, Bangalore (IN); Durgesh Srivastava, Cupertino, CA (US); Shobhit Kumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,661

(22) Filed: Jun. 17, 2019

(65) Prior Publication Data

US 2019/0302885 A1 Oct. 3, 2019

Related U.S. Application Data

(63) Continuation of application No. 15/396,540, filed on Dec. 31, 2016, now Pat. No. 10,324,525.

(51) Int. Cl.
*G06F 3/01* (2006.01)
*G09G 3/34* (2006.01)
(Continued)

(52) U.S. Cl.
CPC ............ *G06F 3/013* (2013.01); *G06F 1/3231* (2013.01); *G06F 1/3296* (2013.01);
(Continued)

(58) Field of Classification Search
CPC ......... G06F 3/013; G09G 3/3406; G09G 5/10
(Continued)

(56) References Cited

U.S. PATENT DOCUMENTS 7,382,364 B2 *  6/2008  Sasaki .................. G06F 1/3203
                                                            345/211
7,461,330 B1 * 12/2008  Cheock ................ G06F 40/103
                                                            715/201
(Continued)

FOREIGN PATENT DOCUMENTS

WO    WO 2013154561 A1    10/2013

OTHER PUBLICATIONS

International Search Report dated Mar. 23, 2018, in International Application No. PCT/US2017/069175, filed Dec. 31, 2017; 5 pages.
(Continued)

*Primary Examiner* — Prabodh M Dharia
(74) *Attorney, Agent, or Firm* — Hanley, Flight & Zimmerman, LLC

(57) ABSTRACT

Context aware backlighting techniques include determining a focal point of a display space based on a user display context. The user display context represents an area of interest on the monitor. The user display context can be based on eye tracking data, ambient light data, motion sensing data, cursor location in the display space, an image content, proximity data, or the like and any combination thereof. A first set of one or more of a plurality of backlight sections corresponding to the determined focal point of the display space can be driven to output at a first intensity level, while a second set of one or more of the plurality of backlight sections can be driven to output at a second intensity level.

20 Claims, 4 Drawing Sheets

(51) Int. Cl.
*G09G 5/10* (2006.01)
*G06F 1/3231* (2019.01)
*G06F 1/3296* (2019.01)

(52) U.S. Cl.
CPC ......... *G09G 3/3406* (2013.01); *G09G 3/3426* (2013.01); *G09G 5/10* (2013.01); *G09G 2320/0646* (2013.01); *G09G 2320/0686* (2013.01); *G09G 2320/10* (2013.01); *G09G 2330/021* (2013.01); *G09G 2354/00* (2013.01); *G09G 2360/144* (2013.01); *G09G 2380/14* (2013.01)

(58) Field of Classification Search
USPC .............. 345/8, 102; 715/744, 727; 362/613
See application file for complete search history.

(56) References Cited

U.S. PATENT DOCUMENTS

| | | | | |
|---|---|---|---|---|
| 9,967,467 | B2* | 5/2018 | Gao | H04N 5/23293 |
| 10,275,087 | B1* | 4/2019 | Smith | G06F 3/044 |
| 10,324,525 | B2 | 6/2019 | Sharma et al. | |
| 2006/0139953 | A1* | 6/2006 | Chou | G02B 3/08 362/613 |
| 2008/0106512 | A1 | 5/2008 | Schwab | |
| 2009/0109129 | A1* | 4/2009 | Cheong | G09G 5/10 345/20 |
| 2009/0207613 | A1* | 8/2009 | Furukawa | G09G 3/3426 362/257 |
| 2011/0126119 | A1 | 5/2011 | Young et al. | |
| 2011/0193895 | A1 | 8/2011 | Johnson et al. | |
| 2011/0292018 | A1 | 12/2011 | Kubota et al. | |
| 2012/0019152 | A1 | 1/2012 | Barnhoefer et al. | |
| 2012/0075536 | A1* | 3/2012 | Uehara | G09G 3/2081 348/731 |
| 2012/0140149 | A1* | 6/2012 | Sakita | G02F 1/133603 349/67 |
| 2012/0287166 | A1 | 11/2012 | Wyatt | |
| 2012/0288139 | A1 | 11/2012 | Singhar | |
| 2014/0049571 | A1 | 2/2014 | Erinjippurath et al. | |
| 2014/0082570 | A1* | 3/2014 | Chung | G06F 3/0485 715/863 |
| 2014/0104082 | A1 | 4/2014 | Nakamura et al. | |
| 2014/0191928 | A1 | 7/2014 | Kobayashi | |
| 2014/0282002 | A1 | 9/2014 | Mckiel, Jr. | |
| 2015/0022435 | A1 | 1/2015 | Luebke | |
| 2015/0061504 | A1* | 3/2015 | Krall | H05B 47/125 315/151 |
| 2015/0079943 | A1* | 3/2015 | Williams | H04W 12/08 455/411 |
| 2016/0044766 | A1 | 2/2016 | Alexander et al. | |
| 2016/0062636 | A1* | 3/2016 | Jung | G06F 3/04817 715/762 |
| 2016/0152139 | A1* | 6/2016 | Sockolosky | B60K 35/00 340/441 |
| 2016/0162242 | A1 | 6/2016 | Xiong et al. | |
| 2016/0180779 | A1 | 6/2016 | Suzuki et al. | |
| 2016/0191158 | A1 | 6/2016 | Aoyama et al. | |
| 2016/0191159 | A1 | 6/2016 | Aoyama et al. | |
| 2016/0293087 | A1 | 10/2016 | Sako et al. | |
| 2016/0322023 | A1 | 11/2016 | Kumar et al. | |
| 2017/0039017 | A1* | 2/2017 | Sakai | H04N 21/6582 |
| 2017/0052751 | A1* | 2/2017 | Aurongzeb | G06F 3/1446 |
| 2017/0188432 | A1 | 6/2017 | Bosua et al. | |
| 2017/0228579 | A1* | 8/2017 | Zhu | G06K 9/0004 |
| 2018/0039085 | A1 | 2/2018 | Van Heugten | |
| 2018/0059774 | A1* | 3/2018 | Lee | G06F 3/011 |
| 2018/0299834 | A1* | 10/2018 | Ely | G04B 3/046 |

OTHER PUBLICATIONS

United States Patent and Trademark Office, "Notice of Allowance," mailed in connection with U.S. Appl. No. 15/396,540, dated Feb. 6, 2019, 11 pages.

United States Patent and Trademark Office, "Non-final Office Action," mailed in connection with U.S. Appl. No. 15/396,540, dated Aug. 2, 2018, 28 pages.

United States Patent and Trademark Office, "Non-final Office Action," mailed in connection with U.S. Appl. No. 15/396,540, dated Feb. 22, 2018, 31 pages.

* cited by examiner

CONTEXT AWARE SELECTIVE BACKLIGHTING TECHNIQUES

PRIORITY DATA

This application is a continuation of U.S. patent application Ser. No. 15/396,540, issued as U.S. Pat. No. 10,324,525, which is incorporated herein by reference.

BACKGROUND

Liquid crystal display (LCD) based televisions, computer monitors, smart phone screens and similar devices have become very common. An LCD monitor uses a plurality of liquid crystal elements and color filters arranged in an array of display pixels. The LCD elements and filters do not produce light by themselves. Instead, a backlight produces the light used for displaying images. Each LCD element selectively transmits or blocks light depending upon the state of the respective LCD element. The filter allows a particular color of light (e.g. wavelength of light) to pass when the corresponding LCD element is in a light transmitting state. The pixels are generally arranged in groups of red, green and blue pixels, or similar color space organizations. Typically, a high percentage of the power required by a device is used by the backlight of its LCD display. Power utilization in electronic devices, particularly devices that are powered by a battery, is almost always a concern and ongoing efforts are made to reduce power consumption.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

DETAILED DESCRIPTION

Figure 1:
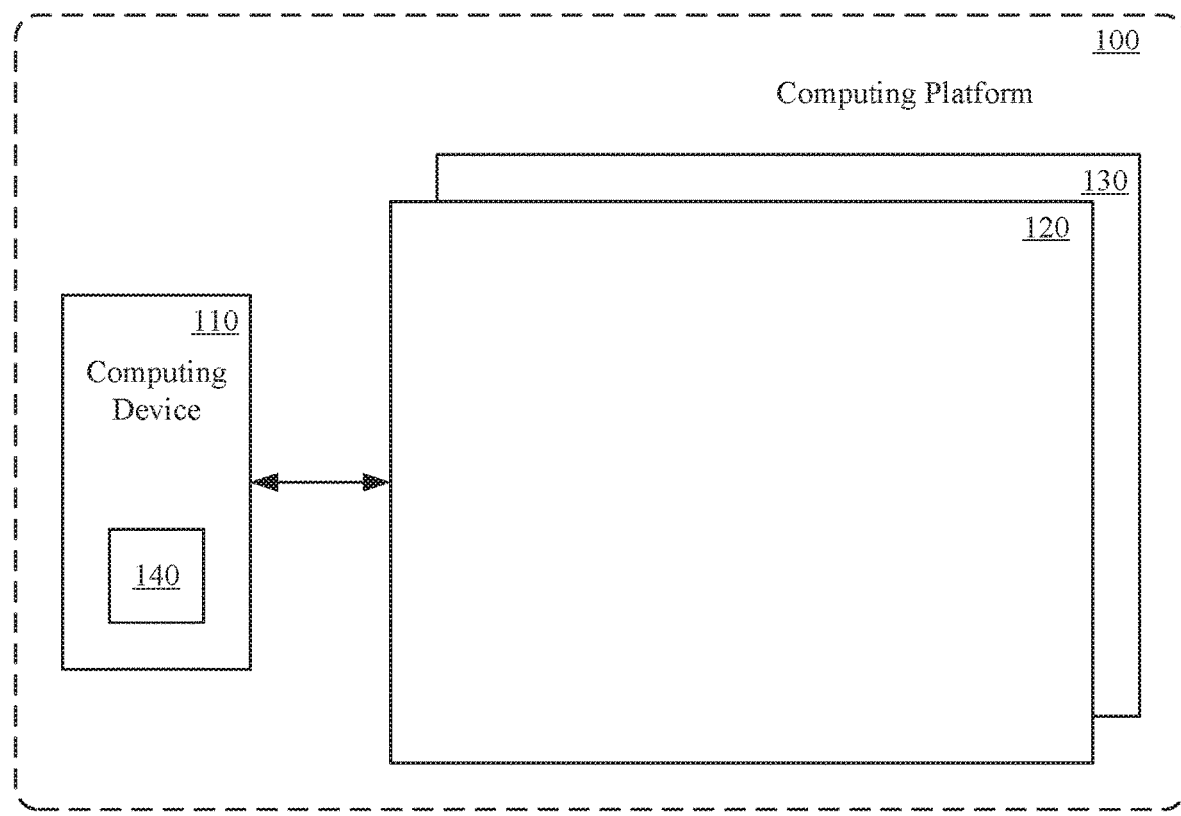
FIG. 1 is a block diagram of a computing platform in accordance with an example embodiment.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "an engine" includes a plurality of such engines.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit) ASIC (an electronic circuit, a processor) shared, dedicated, or group), and/or memory) shared, dedicated, or group (that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as central processing units (CPUs), graphics processing units (GPUs), digital signal processors (DSPs), microcontrollers (MCUs), embedded controller (ECs), field programmable gate arrays (FPGAs), or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

It is to be appreciated that various standalone devices and subsystem of devices used to output images are commonly referred to as displays, monitors, screens, and the like. However, for ease of explaining embodiments of the present invention, such devices and subsystems will be referred to herein as "monitors". Some common monitors, such as LCD screens and televisions, include one or more light generating elements and a plurality of elements that selectively control the output of light from the light generating elements to output images. For ease of explaining embodiments of the present invention, the light generating elements will be referred to herein as a "backlight," and the plurality of elements that selectively control the output of light will be referred to herein as a "display".

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, context aware backlighting can be provided by a backlight controller. The backlight controller can include a sensor input interface, a focal point module and a backlight driver interface. The sensor interface can receive a user display context and/or associated data. The focal point module can determine a focal point of a display space based on the user display context. The user display context represents an area of interest on the monitor. The user display context can be based on eye tracking data, ambient light data, motion sensing data, cursor location in the display space, an image content, proximity data, or the like and any combination thereof. The backlight driver interface can encode a backlight control signal wherein a first set of one or more of the plurality of backlight sections, corresponding to the focal point of the display space, output at a different light intensity than a second set of one or more of the plurality of backlight sections. Additional operating parameters and/or operating modes of the backlight can also be controlled based on the user display context.

FIG. 1 depicts an exemplary computing platform in which embodiments of the present technology can be implemented. In one aspect, the computing platform 100 can include a computing device 110 and one or more input/output devices. One or more of the input/output devices can be a monitor including a display 120 and backlight 130. The backlight 130 can be disposed proximate a first side of the display 120. The display 120 can selectively transmit light generated by the backlight 130 to produce one or more images at a second side of the display 120.

The monitor 120, 130 can be integral to the computing device 110, such as a smart phone, tablet personal computer (PC), laptop (PC), hand held gaming device or the like. Alternatively, the monitor 120, 130 can be an external peripheral of the computing device 110, such as a monitor coupled to a desktop (PC), or the like. In other examples, the computing device 110 can be integral to the monitor 120, 130, such as a television, virtual reality (VR) headset, or the like.

In one aspect, the monitor 120, 130 can for example be a liquid crystal display (LCD) light emitting diode (LED) backlit monitor including an array of LCD elements and an LED backlight. In one aspect, the LED backlight 130 can be an edge-lit white LED (EL-WLED), a white LED (WLED), red-green-blue LED (RGB-LED), or the like backlight subsystem. In one aspect, the backlight 130 can include a plurality of backlight sections that can be selective controlled to emit light at different levels of intensities for one or more of the plurality of backlight sections. In one instance, the backlight may include 15 backlight sections that can each be separately controlled to output at varying intensity levels. In one instance, the backlight may be compliant with one or more embedded display panel (eDP) standards that support panel self-refresh mechanisms by enabling updates to selected regions of a video frame buffer.

In one aspect, a backlight controller 140 can be associated with the monitor 120, 130. The backlight controller 140 can be configured for controlling the operation of the backlight 130. The backlight controller 140 can be integral to the monitor 120, 130 or can be implemented in the computing device 110.

When a user is reading an e-book, composing or reading emails or chat messages, looking at a web page, using a word processing application, and the like, the user is typically focused on a particular part of the display screen. At any point in time, the user may not be interested in all parts of the screen. Instead, the user may be focused on the portion of the screen where the text entry point in an application is positioned. Similarly, the user may be focused on the portion of a touch sensor screen proximate where they are using a finger to navigate content. In another example, the user may be interested in a portion of a webpage, wherein a particular advertisement, menu bar, or the like, is located. In another example, the user may have two or more applications displayed in a screen, where one of the applications is actively being used while the others are not. The user may therefore be focused on the application that is actively displaying dynamic content and/or receiving inputs.

In one aspect, the backlight controller 140 can be configured to receive and/or determine a user display context (UDC) and/or applicable data. The user display context represents an area of interest on the monitor. The user display context can be based on eye tracking data, ambient light data, motion sensing data, cursor location in the display space, an image content, proximity data, or the like and any combination thereof.

In one aspect, the backlight controller 140 can include one or more application programming interfaces (APIs) (e.g., software-to-software exchange) to receive the user context and/or applicable data from one or more software routines. As used herein, the term "software routine" includes routines, utilities, applets, operating system, and the like. Alternatively or in addition, the backlight controller 140 can include in one or more application binary interfaces (e.g., hardware-to-software or hardware-to-hardware exchange) to receive the user context from one or more hardware and/or firmware circuits.

In one example, the backlight controller 140 may receive input from an eye tracker sensor such as a camera indicative of where a user is looking. In another example, the backlight controller 140 may receive input from a proximity sensor indicative how far away the user is from the monitor. In another example, the backlight controller 140 may receive input from one or more sensors including an accelerometer, a gyroscope, and/or a global position system (GPS) indicative of whether the user is in motion. In another example, the backlight controller 140 may receive input from an ambient light sensor or camera indicative of an ambient light level.

In one aspect, the backlight controller 140 can be configured to determine a focal point of a display space based on the user display context. Based on the user display context, the backlight controller 140 can determine that a user is looking at a specific portion of the display 120. The backlight controller 140 may also be able to determine that the user is looking at the display 120 as a whole. The backlight controller 140 may also be able to determine that the user is not looking at the display 120.

For example, the backlight controller 140 may determine the focal point of the display based on cursor location data received from a pointing device and alphanumeric data received from a keyboard. In another example, the backlight controller 140 may determine the focal point of the display based on an indication, received from an eye tracking sensor, of a portion of the display that a user is looking at. In yet another example, the backlight controller 140 may determine that a user is not looking at the display based on data received from an eye tracking sensor. Alternatively, the backlight controller 140 may determine that a user is not looking at the display based on data received from an accelerometer indicating movement and an ambient light sensor indicating changing ambient light levels, which may indicate that the user is walking and is probably not focused on the display 120.

In one aspect, the backlight controller 140 can be configured to encode one or more backlight control signals, so that a first set of one or more of the plurality of backlight sections, corresponding to a focal point of the display space, outputs at a different light intensity than a second set of one or more of the plurality of backlight sections. The backlight controller 140 can also be configured to encode one or more backlight control signals, so that one or more additional sets of backlight sections disposed between first and second set output at one or more intensity levels of the first and second set of backlight sections to provide a more gradual transition in intensity, that will be less perceptible to the user. The additional one or more sets of backlight sections outputting at one or more intermediate intensity levels also allow the user to more easy see other areas of the display of interest as the user's eyes move about the display. The backlight controller 140 can also be configured to encode one or more backlight control signals, wherein a change in intensity between the first and second set of backlight sections occurs gradually over a predetermined time that will be less perceptible to the user.

The selective backlighting can also be enabled or disabled for one or more various use cases. For example, the backlight controller 140 can also be configured to output at different light intensities during a power saving mode. However, during normal runtime mode, the backlight driver interface can be configured to encode the backlight control signal wherein the first set of one or more of the plurality of backlight sections, corresponding to the focal point of the display space, output at the same light intensity as the second set of one or more of the plurality of backlight section.

In another example, selective backlighting can be enabled for activities such as e-book reading or web-browsing when a user is likely to be focused on a portion of the monitor corresponding to a subset of the plurality of backlight sections. In another example, selective backlighting can be disabled when the user display context or data associated therewith indicates that the ambient light levels are regularly changing, indicative of the user walking, riding a bus or the like, where it would be preferable to adjust all the backlight sections relative to the ambient light so that the monitor is easier to view. In such situations, it may be preferable to increase the intensity of all the backlight sections as the ambient light intensity increases, and decrease the intensity of all the backlight sections as the ambient light intensity decreases. In other examples, selective backlight can be disabled when the user display context or data associated therewith indicates that the eye tracking for the given size of the monitor cannot be accurately determined, or the user is far enough away from the screen such that the user focused on the entire display space and not a portion thereof. In one embodiment, selective backlighting can be enabled when an electronic device is being powered by a battery, or other exhaustible power source, and can be disabled when the electronic device is being powered by an A/C power outlet, or the like.

In another example, if the user display context indicates that the user is not currently looking at the display, selective backlighting can be disabled, and all the backlight sections can be controlled to output at a predetermined lower intensity level to conserve power. When the user display context indicates that the user is currently looking at the display, the backlight driver interface can be configured to encode one or more backlight control signals, with a first set of one or more of the plurality of backlight sections that the user is currently focused on outputting at a higher light intensity than the other backlight sections.

In another example, the backlight driver interface can be configured to encode the backlight control signal with the first set of one or more of the plurality of backlight sections, corresponding to the focal point of the display space, outputting at a different light intensity than a second set of one or more of the plurality of backlight sections when the proximity data is in a first range. However, when the proximity data is in a second range, the backlight driver interface can be configured to encode the backlight control signal with all of the backlight sections outputting at the same light intensity. For example, the computing platform may be a virtual reality headset employing a smart phone or other computing device having a relatively small form factor display. When the smart phone is being used in the VR headset and the proximity of the display to the user is determined to be in a relatively close range, the backlight driver interface can control the plurality of backlight display sections to output at different light intensities based on the user's focus point on a given portion of the display. In this case, the proximity of the display to the eyes of the user is appropriate for use of selective backlight illumination because the eyes of the user are generally focused on a portion of the display corresponding to a subset of the plurality of backlight sections. However, when the smart phone is being used at arms-length for calling, messaging, browsing and the like, the backlight driver interface can control the plurality of backlight section to output at the same intensity. In such case, the eyes of the user are generally focused on the entire display and consequently all of the plurality of backlight sections.

Selectively controlling the illumination level of portions of the display space can advantageously reduce power consumption by the backlight and consequently power consumption by the computing device. Selectively controlling the illumination level of portions of the display space can also advantageously improve contrast. Selectively controlling the illumination of portions of the display space can also advantageously improve the user experience. For example, the reduced power consumption can increase the runtime of mobile computing devices operating on battery power, and improve the user experience. Similarly, the increased contrast can improve the visibility of the display, and improve the user experience.

Figure 2:
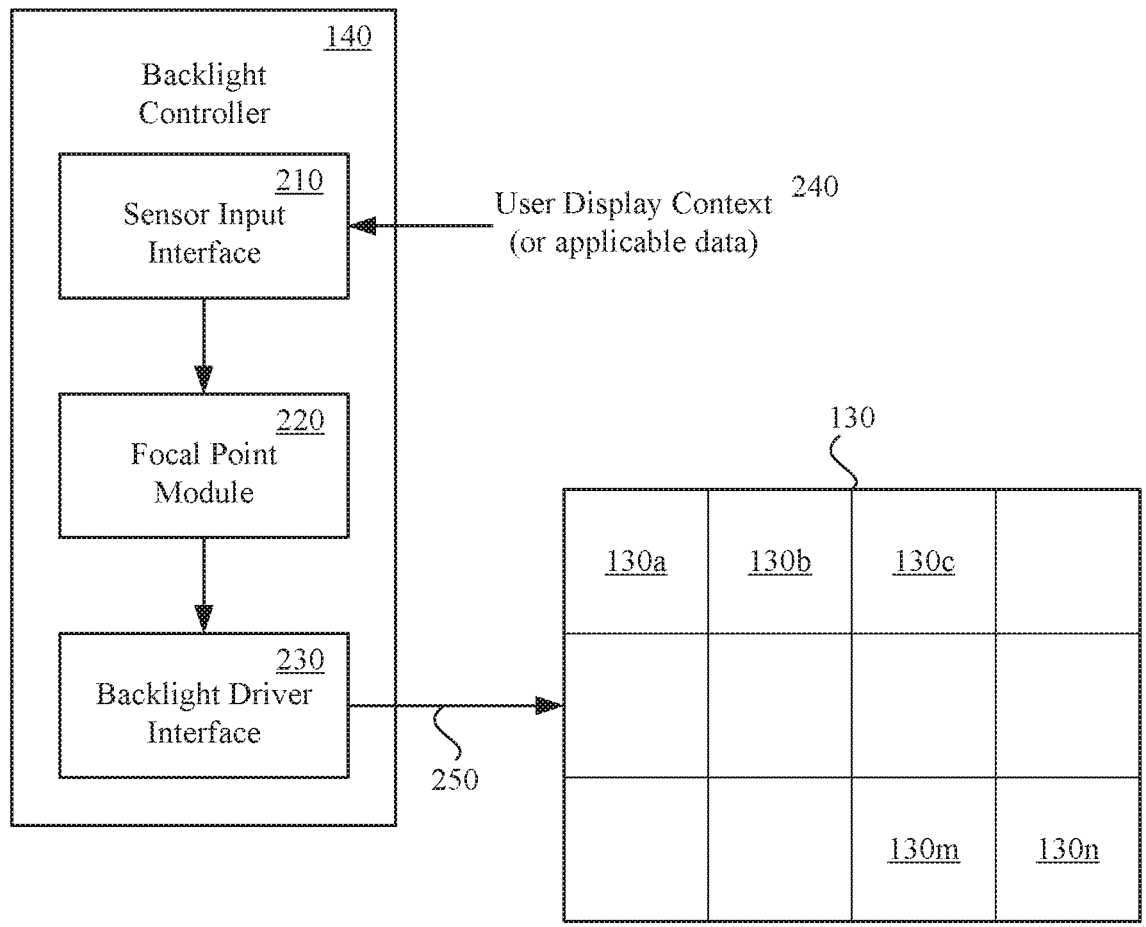
FIG. 2 is a block diagram of a backlight controller in accordance with an example embodiment.

FIG. 2 shows schematic of a backlight controller in accordance with an example embodiment. The backlight controller 140 can include a sensor input interface 210, a focal point module 220, and a backlight driver interface 230. In one aspect, the sensor input interface can be configured to receive a user display context or data applicable to determining a user display context 240. The user display context represents an area of interest on the monitor. In one instance, the user display context and/or applicable data may be received from one or more software routines, firmware and/or hardware.

In one aspect, the sensor input interface 210 can be implemented in one or more application programming interfaces (APIs) (e.g., software-to-software exchange) to receive the user context and/or applicable data from one or more software routines. Alternatively, or in addition, the sensor input interface can be implemented in one or more application binary interfaces (e.g., hardware-to-software or hardware-to-hardware exchange) to receive the user context and/or applicable data from one or more hardware and/or firmware circuits.

The user display context can be based on eye tracking data, ambient light data, motion sensing data, cursor location in the display space, image data, proximity data, power source data, or the like and any combination thereof. If applicable data is received, the data may include eye tracking data, ambient light data, motion sensing data, cursor location in the display space, image data, proximity data, power source data, or the like and any combination thereof.

In one aspect, the focal point module 220 can be configured to determine a focal point of a display space based on the user display context and/or associated data. In one instance, the user display content is based on applicable data processed by other software, firmware and/or hardware outside the backlight controller. In such case, the focal point module 220 can determine the focal point of the display space from the received user display context. In another instance, the sensor input interface 210 may receive applicable raw data. In such case, the focal point module 220 can determine the focal point of the display space from the applicable raw data, without the user display context explicitly being determined first. Alternatively, the focal point module 220 can determine the user display content from the applicable raw data 240 and then determine the focal point of the display space from the determined user display context.

In one aspect, the backlight driver interface 230 can be configured to encode a backlight control signal 250, wherein a first set of one or more of the plurality of backlight sections 130a-n, corresponding to the focal point of the display space, can be output at a different light intensity than a second set of one or more of the plurality of backlight sections 130a-n. The backlight driver interface 230 can also be configured to encode one or more backlight control signals, wherein one or more additional sets of backlight sections disposed between first and second set output at one or more intensity levels of the first and second set of backlight sections so that a more gradual transition in intensity, that will be less perceptible to the user, is generated. The additional one or more sets of backlight sections outputting at one or more intermediate intensity levels also allows the user to more easily see other areas of the display of interest as the user's eyes move about the display. The backlight driver interface 230 can also be configured to encode one or more backlight control signals, wherein a change in intensity between the first and second set of backlight sections occurs gradually over a predetermined time that will be less perceptible (e.g. nearly imperceptible, or imperceptible) to the user.

The selective backlighting can also be enabled or disabled for one or more various use cases. For example, the backlight controller 140 can also be configured to output at different light intensities during a power saving mode. However, during normal runtime mode, the backlight driver interface can be configured to encode the backlight control signal wherein the first set of one or more of the plurality of backlight sections, corresponding to the focal point of the display space, output at the same light intensity as the second set of one or more of the plurality of backlight section.

Figure 3:
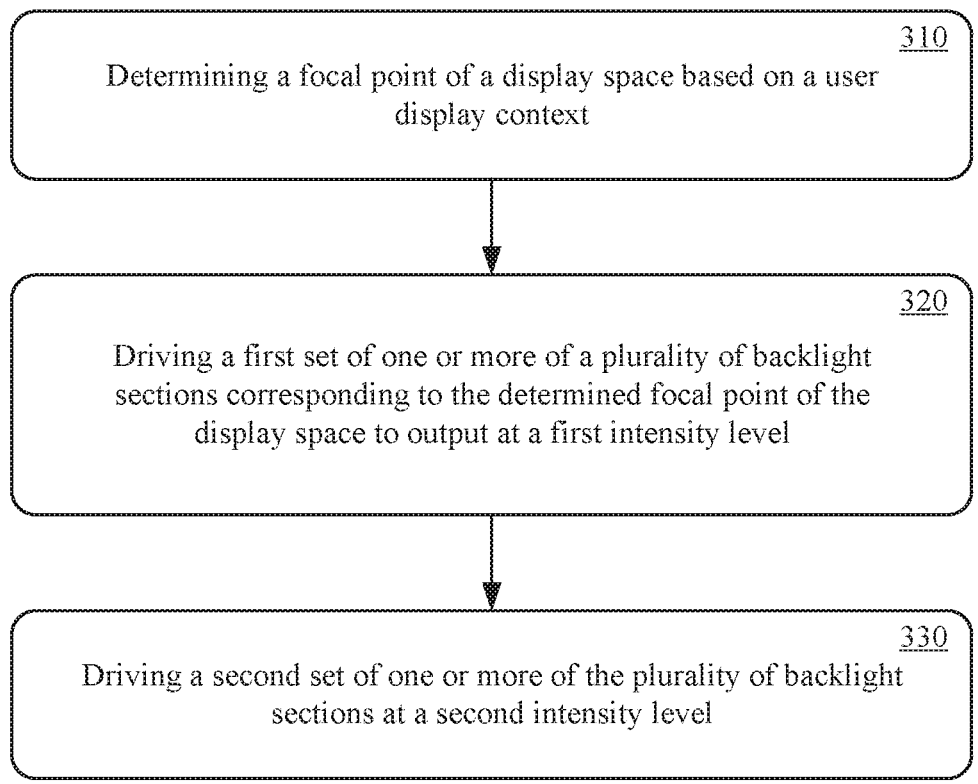
FIG. 3 is a flow diagram of a backlighting method in accordance with an example embodiment.

FIG. 3 illustrates a backlighting method in accordance with an example embodiment. In one aspect, a focal point of a display space is determined based on a user display context 310.

In one aspect, a first set of one or more of a plurality of backlight sections corresponding to the determined focal point of the display is driven to output at a first intensity level 320. A second set of one or more of the plurality of backlight sections are driven at a second intensity level 330.

In one instance, the first intensity level can be increased above a predetermined intensity level, and the second intensity level is the predetermined intensity level. In another instance, the first intensity level can be a predetermined intensity level, and the second intensity level is decrease below the predetermined intensity level.

The selective backlighting can also be enabled or disabled for one or more various use cases. In one instance, the first set of one or more of the plurality of backlight sections corresponding to the determined focal point of the display space can be driven to output at the first intensity level and the second set of one or more of the plurality of backlight sections can be driven at the second intensity level during a power save mode. During normal runtime mode, the plurality of backlight sections can be driven at the first intensity level.

Figure 4:
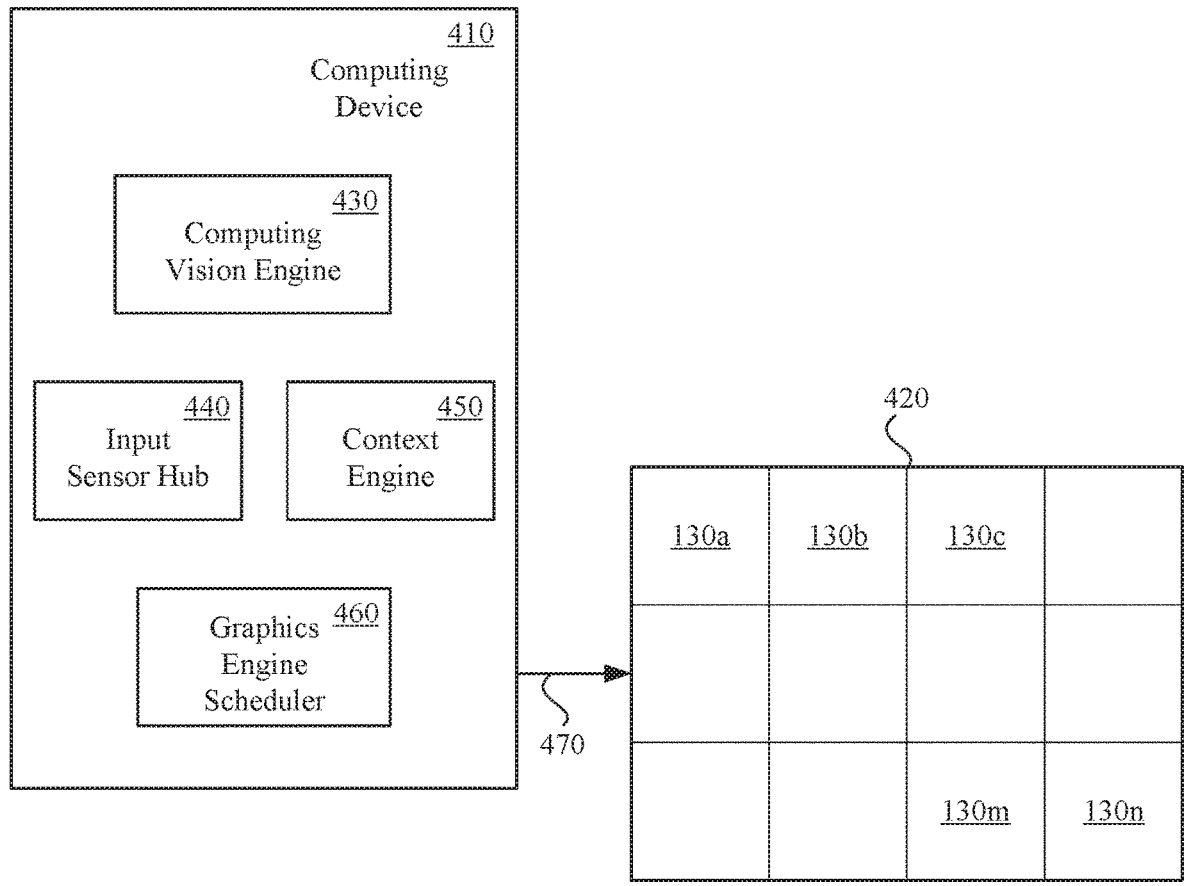
FIG. 4 is a block diagram of a computing platform in accordance with another example embodiment.

FIG. 4 shows a computing platform in accordance with another example. The computing platform 400 can include a computing device 410 and a monitor 420. The computing device 410 and monitor 420 may be implemented as separate devices as illustrated, such as a desktop PC and monitor. Alternatively, the monitor 420 can be integral to the computing device 410, such as in a laptop PC, tablet PC, or smartphone. The computing device 410 can also be integral to the monitor 420, such as a television, virtual reality (VR) headset, or the like.

In one aspect, the monitor 420 includes a backlight and a display. In one aspect, the monitor 120, 130 can for example be a liquid crystal display (LCD) light emitting diode (LED) backlit monitor including an array of LCD elements and an LED backlight. In one aspect, the LED backlight 130 can be an edge-lit white LED (EL-WLED), a white LED (WLED), red-green-blue LED (RGB-LED), or the like backlight subsystem. The backlight can include a plurality of backlight sections 130a-n. Each backlight section 130a-n can be selectively controlled to generate light with a range of intensity. The range of intensities may be substantially continuous from a predetermined minimum intensity to a predetermined maximum intensity. Alternatively, the range of intensities may be a plurality of discrete levels between a predetermined minimum intensity to a predetermined maximum intensity. In one implementation, the monitor 420 includes an eDP compliant driver for programming regional backlight updates.

In one aspect, the computing device 410 includes a computing vision engine 430, a sensor hub 440, a context engine 450 and a graphics engine scheduler 460. In one aspect, the computer vision engine 430 can determine a portion of the display that the user is focused on. Conventional computer vision engines can accurately track the eye gaze of users to allow the ability to open and control various software including surfing the Web, making telephone calls, sending e-mails and text message, creating artwork, playing computer games and the like on computing devices. In one example, infrared light sources, such as an infrared diode can be used to illuminate the eyes of the user. Two camera sensors, such as low power CMOS camera sensors, can be used to capture data regarding the reflection of the infrared light off of the retina and the cornea of the user, commonly referred to as "red eye" and glint respectively. Software, firmware and/or hardware, in a central processing unit (CPU, AP), digital signal processor (DSP) or the like, can use the data captured by the camera sensors to build a three-dimensional (3D) model of the user's eyes. The three-dimensional (3D) model of the user's eyes can in turn be used to determine where the user is looking (gaze point or focal point) and where the user's eyes are in space relative to the location of the camera sensors, computing device 410 and/or monitor 420.

In one aspect, the sensor hub 440 can include one or more sensors such as an ambient light sensor (ALS), one or more accelerometers, one or more gyroscopes, global position system (GPS) receiver, a magnetometer, and or the like. Although the sensor hub 440 and the computer vision engine 430 are described as separate components, it is to be appreciated that the computer vision engine 430 may be combined with the sensors of the sensor hub as an integrated sensor hub. Alternatively, the computer vision engine 420 and sensor hub 440 may share one or more sensors, such as the camera sensors to capture both image data and ambient light intensity level data.

In one aspect, the context engine 450 can be configured to receive and/or determine a user display context (UDC) and/or applicable data. The user display context represents an area of interest on the monitor. The user display context can be based on eye tracking data, ambient light data, motion sensing data, cursor location in the display space, an image content, proximity data, power source data, or the like and any combination thereof.

In one aspect, the context engine 450 can be configured to determine a focal point of a display space based on the user display context. Based on the user display context, the context engine 450 can determine that a user is looking at a specific portion of the display 420. The context engine 450 may also be able to determine that the user is looking at the display 420 as a whole. The context engine 450 may also be able to determine that the user is not looking at the display 420.

In one aspect, the graphics engine schedule 460 can be configured to encode one or more backlight control signals, wherein a first set of one or more of the plurality of backlight sections, corresponding to the focal point of the display space, outputs at a different light intensity than a second set of one or more of the plurality of backlight sections. The graphics engine schedule 460 can also be configured to encode one or more backlight control signals, wherein one or more additional sets of backlight sections disposed between first and second set output at one or more intensity levels of the first and second set of backlight sections so that a more gradual transition in intensity, that will be less perceptible to the user, is generated. The additional one or more sets of backlight sections outputting at one or more intermediate intensity levels also allow the user to more easily see other areas of the display of interest as the user's eyes move about the display (e.g. the user's gaze or focal point moves or changes). The backlight controller 140 can also be configured to encode one or more backlight control signals, wherein a change in intensity between the first and second set of backlight sections occurs gradually over a predetermined time that will be less perceptible, minimally perceptible, or imperceptible to the user.

The selective backlighting can also be enabled or disabled for one or more various use cases. For example, the graphics engine schedule 460 can also be configured to output at different light intensities during a power saving mode. However, during normal runtime mode, the backlight driver interface can be configured to encode the backlight control signal wherein the first set of one or more of the plurality of backlight sections, corresponding to the focal point of the display space, output at the same light intensity as the second set of one or more of the plurality of backlight section.

In one implementation, the graphics engine scheduler 460 can be a firmware/hardware based implementation of various image processing/enhancement algorithms.

In one implementation, the camera sensor can be interfaced directly with a DSP, instead of an AP, for real-time access. The DSP can be used exclusively for eye tracking. The DSP can be used in a low power (LP) implementation, with fixed function blocks, allowing the CPU of the computing device 410 to be unused and hence provide LP wakeup in response to detection of user focus on the screen. The fixed function blocks can provide a high level of accuracy and speed for real time eye tracking.

The graphics engine scheduler 460 may be communicatively coupled to the backlight 130a-130n by one or more auxiliary communication (AUX) channels of the computing device 410. In one implementation, the engine scheduler can directly access the AUX channels to communicate with the eDP sink device to program regional backlight updates. The monitor 420 can also include a backlight booster chip with fine grains frequency control to provide a smooth gradient to avoid flicker because of quick pulse with modulation (PWM) level changes. The algorithm to smooth out the backlight changes to give a continuous tracking kind of movement of backlight lit regions, matching eye movement, etc., can be implemented in firmware of the graphics engine scheduler.

A typical laptop PC may consume approximately 40 Watts of power while a browser application is running. Taking into account the typical CPU idle time of computing devices, an average display consumes about 75 percent of system power. Therefore, the backlight may consume almost 30 Watts of power. If a backlight includes 15 sections, and dimming sections of the backlight results in a 5% reduction in power consumption, by selectively dimming all but one section at which a user is looking, 1.4 Watts of power can be saved. A CMOS based eye tracking subsystem currently may consume approximately 100-400 milli-Watts. Therefore, at least net savings of 1 Watt of power will be achieved after factoring in power consumed by an eye tracking subsystem.

Again, selectively controlling the illumination level of portions of the display space can advantageously reduce power consumption by the backlight and consequently power consumption by the computing device. Selectively controlling the illumination level of portions of the display space can also advantageously improve contrast. Selectively controlling the illumination of portions of the display space an also advantageously improve the user experience. For example, the reduced power consumption can increase the runtime of mobile computing devices operating on battery power, thereby improving the user experience. Similarly, the increased contrast can improve the visibility of the display, thereby improving the user experience.

Examples

The following examples pertain to specific technology embodiments and point out specific features, elements, or steps that may be used or otherwise combined in achieving such embodiments.

In one example there is provided, a backlight controller comprising: a sensor input interface to receive a user display context; a focal point module to determine a focal point of a display space based on the user display context; and a backlight driver interface to encode a backlight control signal wherein a first set of one or more of the plurality of backlight sections, corresponding to the focal point of the display space, output at a different light intensity than a second set of one or more of the plurality of backlight sections.

In one example of a backlight controller, the sensor input interface to receive the user display context includes an application programming interface (API) to receive context display data from one or more software routines.

In one example of a backlight controller, the sensor input interface to receive the user display context includes an application binary interface to decode the context display from one or more sensor signals.

In one example of a backlight controller, the user display context is based on eye tracking data.

In one example of a backlight controller, the user display context is based on ambient light data.

In one example of a backlight controller, the user display context is based on motion sensing data.

In one example of a backlight controller, the user display context is based on a cursor location in the display space.

In one example of a backlight controller, the user display context is based on an image content.

In one example of a backlight controller, the backlight driver interface to encode the backlight control signal wherein the first set of one or more of the plurality of backlight sections, corresponding to the focal point of the display space, output at the different light intensity than the second set of one or more of the plurality of backlight section during a power save mode.

In one example of a backlight controller, the backlight driver interface to encode the backlight control signal wherein the first set of one or more of the plurality of backlight sections, corresponding to the focal point of the display space, output at the same light intensity as the second set of one or more of the plurality of backlight section during a normal runtime mode.

In one example of a backlight controller, the user display context is based on proximity data.

In one example of a backlight controller, the backlight driver interface to encode the backlight control signal wherein the first set of one or more of the plurality of backlight sections, corresponding to the focal point of the display space, output at the different light intensity than the second set of one or more of the plurality of backlight section when the proximity data is in a first range.

In one example of a backlight controller, the backlight driver interface to encode the backlight control signal wherein the first set of one or more of the plurality of backlight sections, corresponding to the focal point of the display space, output at the same light intensity as the second set of one or more of the plurality of backlight section when the proximity data is in a second range.

In one example there is provided, a backlight controller comprising: a sensor input interface to receive one or more sensor input signals; a focal point module to determine a focal point of a display space from the one or more sensor input signals; and a backlight driver interface to encode a backlight control signal wherein a first set of one or more of the plurality of backlight sections, corresponding to the focal point of the display space, output at a different light intensity than a second set of one or more of the plurality of backlight sections.

In one example of a backlight controller, the focal point of the display space is determined as a function of one or more eye tracking sensor signals.

In one example of a backlight controller, the focal point of the display space is determined as a function of a light sensor signal.

In one example of a backlight controller, the focal point of the display space is determined as a function of one or more image sensor signals.

In one example of a backlight controller, the focal point of the display space is determined as a function of one or more motion sensor signal.

In one example of a backlight controller, the focal point of the display space is determined as a function of frame buffer signals.

In one example of a backlight controller, the focal point of the display space is determined as a function of one or more cursor location signals.

In one example of a backlight controller, the focal point of the display space is determined as a function of one or more proximity signals.

In one example of a backlight controller, wherein the backlight driver API to encode the backlight control signal wherein the first set of one or more of the plurality of backlight sections, corresponding to the focal point of the display space, output at the different light intensity than the second set of one or more of the plurality of backlight section when the proximity data is in a first range.

In one example of a backlight controller, the backlight driver API to encode the backlight control signal wherein the first set of one or more of the plurality of backlight sections, corresponding to the focal point of the display space, output at the same light intensity as the second set of one or more of the plurality of backlight section when the proximity data is in a second range.

In one example of a backlight controller, the backlight driver API to encode the backlight control signal wherein the first set of one or more of the plurality of backlight sections, corresponding to the focal point of the display space, output at the different light intensity than the second set of one or more of the plurality of backlight section during a power save mode.

In one example of a backlight controller, the backlight driver API to encode the backlight control signal wherein the first set of one or more of the plurality of backlight sections, corresponding to the focal point of the display space, output at the same light intensity as the second set of one or more of the plurality of backlight section during a normal runtime mode.

In one example, there is provided a method of controlling illumination of a monitor comprising: determining a focal point of a display space based on a user display context; driving a first set of one or more of a plurality of backlight sections corresponding to the determined focal point of the display space to output at a first intensity level; and driving a second set of one or more of the plurality of backlight sections at a second intensity level.

In one example of a method of controlling illumination of a monitor, the first intensity level is increased above a predetermined intensity level; and the second intensity level is the predetermined intensity level.

In one example of a method of controlling illumination of a monitor, the first intensity level is a predetermined intensity level; and the second intensity level decreased below the predetermined intensity level.

In one example, a method of controlling illumination of a monitor further comprises: driving the first set of one or more of the plurality of backlight sections corresponding to the determined focal point of the display space to output at the first intensity level during a power save mode; and driving the second set of one or more of the plurality of backlight sections at the second intensity level during the power save mode.

In one example, a method of controlling illumination of a monitor, further comprises driving the plurality of backlight sections at the first intensity level during a normal runtime mode.

In one example there is provided, a monitor management system comprising: an array of display elements; a backlight, disposed proximate a first side of the array of display elements, including a plurality of backlight sections; one or more sensors to determine a user display context; and a backlight controller to control the light intensity output by each of a plurality of backlight sections based on the user display context, wherein a first subset of the plurality of backlight sections output at a first light intensity and a second subset of the plurality of backlight sections output at a second light intensity.

In one example there is provided, a monitor management system comprising: an array of display elements; a backlight, disposed proximate a first side of the array of display elements, including a plurality of backlight sections; one or more sensors to determine a user display context; a backlight controller to control the light intensity output by each of a plurality of backlight sections based on the user display context, wherein a first subset of the plurality of backlight sections output at a first light intensity and a second subset of the plurality of backlight sections output at a second light intensity.

In one example of a monitor management system, the one or more sensors to determine a user display context includes an application programming interface (API) to receive context display data from one or more software routines.

In one example of a monitor management system, the one or more sensors to determine a user display context includes an application binary interface to decode the context display from one or more sensor signals.

In one example of a monitor management system, the user display context is based on eye tracking data.

In one example of a monitor management system, the user display context is based on motion sensing data.

In one example of a monitor management system, the user display context is based on a cursor location in the display space.

In one example of a monitor management system, the user display context is based on an image content.

In one example of a monitor management system, the backlight controller further comprises a backlight driver interface to encode the backlight control signal wherein the first set of one or more of the plurality of backlight sections, corresponding to the focal point of the display space, output at a different light intensity than the second set of one or more of the plurality of backlight section during a power save mode.

In one example of a monitor management system, the backlight controller of further comprises a backlight driver interface to encode the backlight control signal wherein the first set of one or more of the plurality of backlight sections, corresponding to the focal point of the display space, output at the same light intensity as the second set of one or more of the plurality of backlight section during a normal runtime mode.

In one example of a monitor management system, the user display context is based on proximity data.

In one example of a monitor management system, the backlight driver interface to encode the backlight control signal wherein the first set of one or more of the plurality of backlight sections, corresponding to the focal point of the display space, output at the different light intensity than the second set of one or more of the plurality of backlight section when the proximity data is in a first range.

In one example of a monitor management system, the backlight driver interface to encode the backlight control signal wherein the first set of one or more of the plurality of backlight sections, corresponding to the focal point of the display space, output at the same light intensity as the second set of one or more of the plurality of backlight section when the proximity data is in a second range.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A monitor management system comprising:
an array of display elements;
a backlight, disposed proximate a first side of the array of display elements, the blacklight including backlight sections;
one or more sensors to determine a user display context, wherein the user display context is based on a cursor location in the display space; and
a backlight controller to:
control a light intensity output by respective ones of the backlight sections based on the user display context;
cause a first subset of the backlight sections to output at a first light intensity; and
cause a second subset of the backlight sections to output at a second light intensity.

2. The monitor management system of claim 1, wherein the monitor management system includes an application programming interface (API) to receive context display data from one or more software routines.

3. The monitor management system of claim 2, wherein the one or more sensors to determine a user display context includes an application binary interface to decode the context display data from one or more sensor signals.

4. The monitor management system of claim 1, wherein the user display context is based on eye tracking data.

5. The monitor management systems of claim 1, wherein the user display context is based on ambient light data.

6. The monitor management system of claim 1, wherein the user display context is based on motion sensing data.

7. The monitor management system of claim 1, wherein the user display context is based on an image content.

8. The monitor management system of claim 1, wherein the backlight controller includes a backlight driver interface to encode a backlight control signal wherein the first set of one or more backlight sections, corresponding to a focal point of the display space, output at a different light intensity than the second set of one or more backlight sections during a power save mode.

9. The monitor management system of claim 1, wherein the backlight controller further comprises a backlight driver interface to encode the backlight control signal wherein the first set of one or more backlight sections, corresponding to a focal point of the display space, output at the same light intensity as the second set of one or more backlight sections during a normal runtime mode.

10. The monitor management system of claim 1, wherein the user display context is based on proximity data.

11. The monitor management system of claim 1, wherein the backlight driver interface to encode the backlight control signal wherein the first set of one or more backlight sections, corresponding to a focal point of the display space, output at the different light intensity than the second set of one or more backlight sections when the proximity data is in a first range.

12. The monitor management system of claim 11, wherein the backlight driver interface to encode the backlight control signal wherein the first set of one or more backlight sections, corresponding to a focal point of the display space, output at the same light intensity as the second set of one or more backlight sections when the proximity data is in a second range.

13. The monitor management system of claim 1, wherein the camera is configured to track a user's eyes.

14. The monitor management system of claim 1, further including a focal point module to determine a focal point of a display space based on the user display context.

15. The monitor management system of claim 1, wherein the one or more sensors includes at least one of a camera, a proximity sensor, an accelerometer, a gyroscope, a global positioning system (GPS), or an ambient lightsensor.

16. A method of controlling illumination of a monitor comprising:
providing a focal point module configured to determine a focal point of a display space based on a user display context based on a cursor location in the display space; and
providing a backlight driver interface to:
control a first set of one or more backlight sections corresponding to the determined focal point of the display space and output at a first intensity level and control; and
control a second set of one or more backlight sections at a second intensity level.

17. The method according to claim 16, wherein,
the first intensity level is increased above a predetermined intensity level; and
the second intensity level is the predetermined intensity level.

18. The method according to claim 16, wherein,
the first intensity level is a predetermined intensity level; and
the second intensity level decreased below the predetermined intensity level.

19. The method according to claim 16, wherein the backlight driver is to control the first set of one or more backlight sections corresponding to the determined focal point of the display space to output at the first intensity level during a power save mode, and control the second set of one or more backlight sections at the second intensity level during the power save mode.

20. The method according to claim 19, wherein the backlight driver is configured to control backlight sections at the first intensity level during a normal runtime mode.

* * * * *